Sept. 23, 1924.
H. H. HARRISON
APPARATUS FOR TREATING CRANBERRIES
Filed Dec. 1, 1922
5 Sheets-Sheet 1
1,509,204
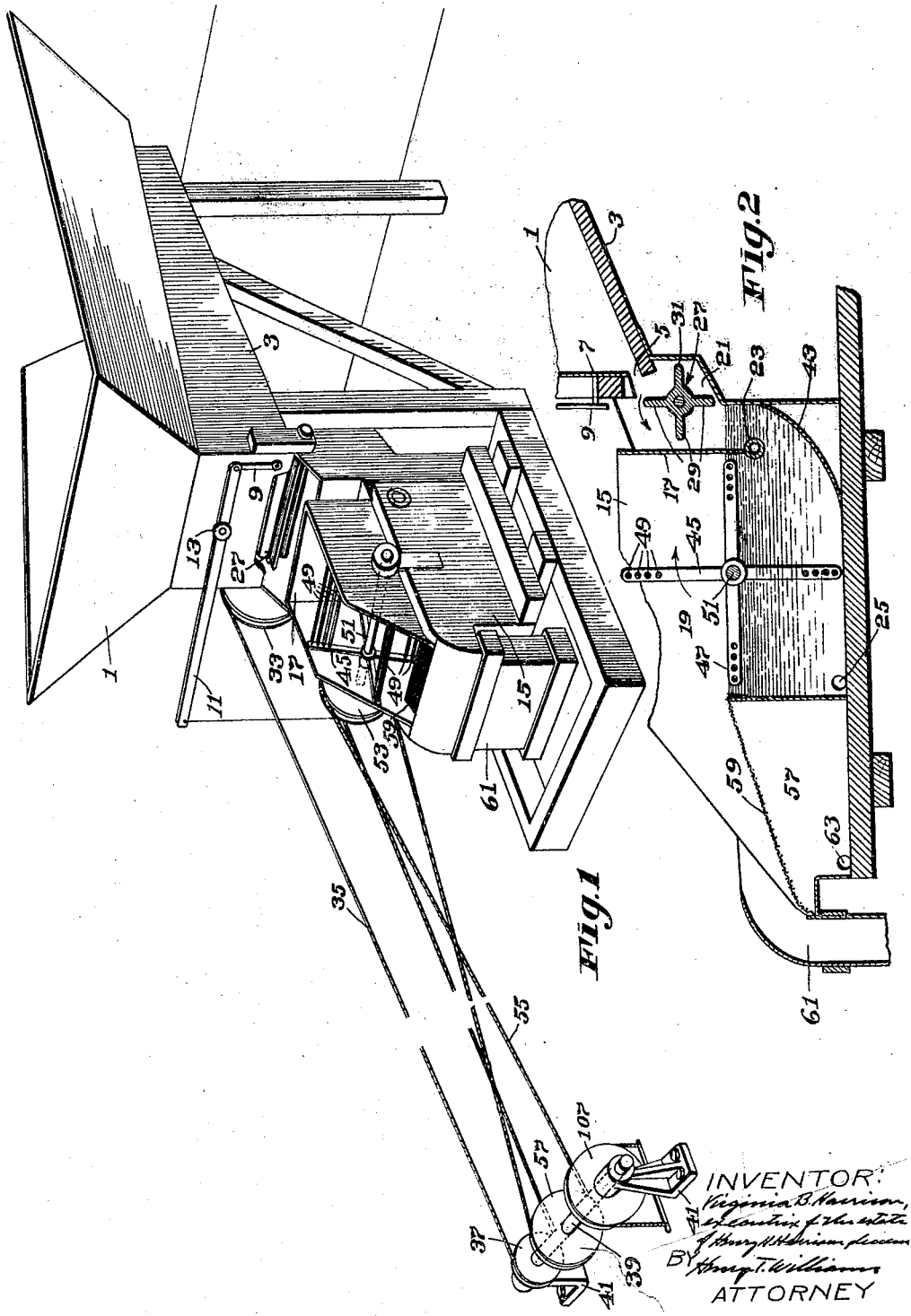

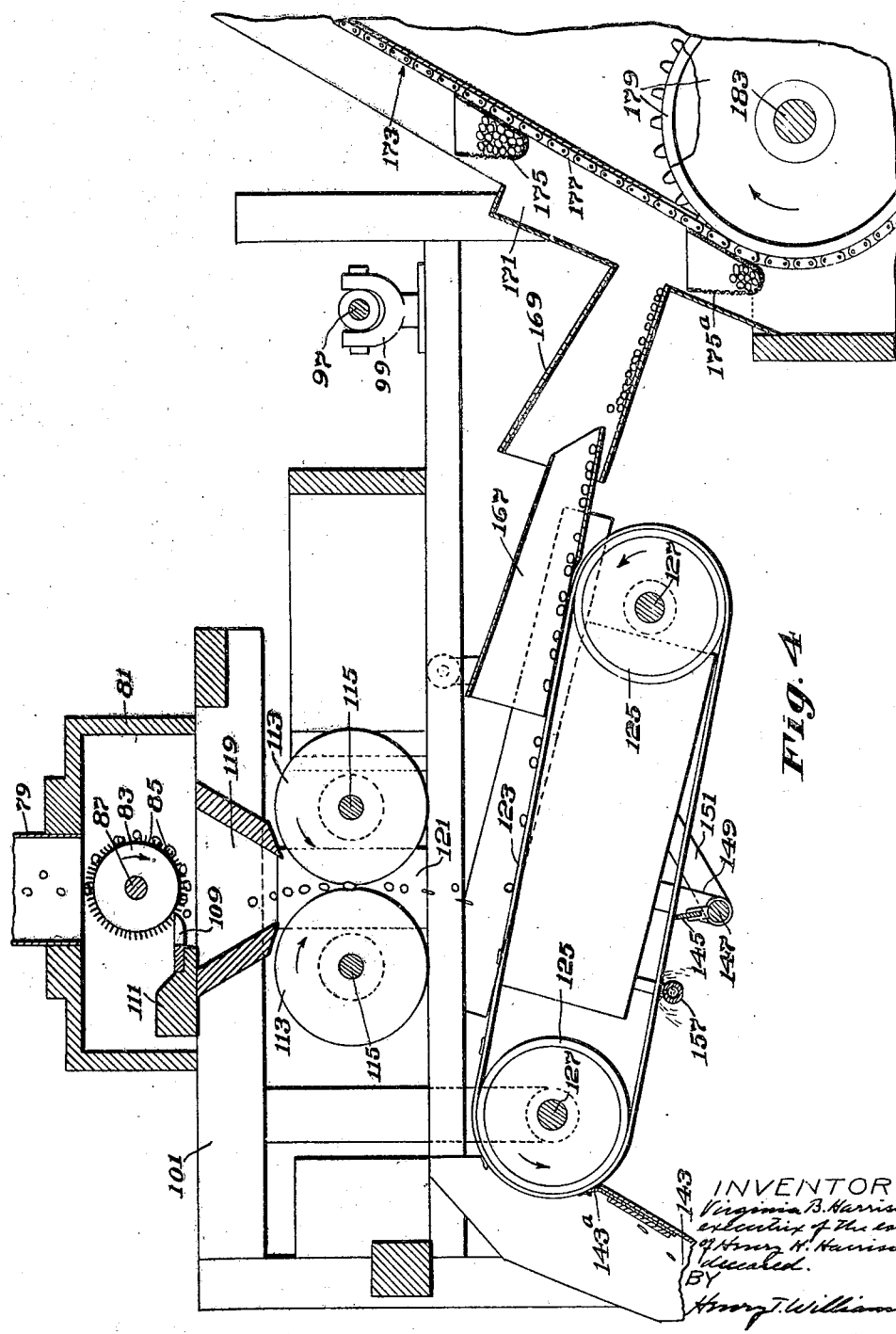

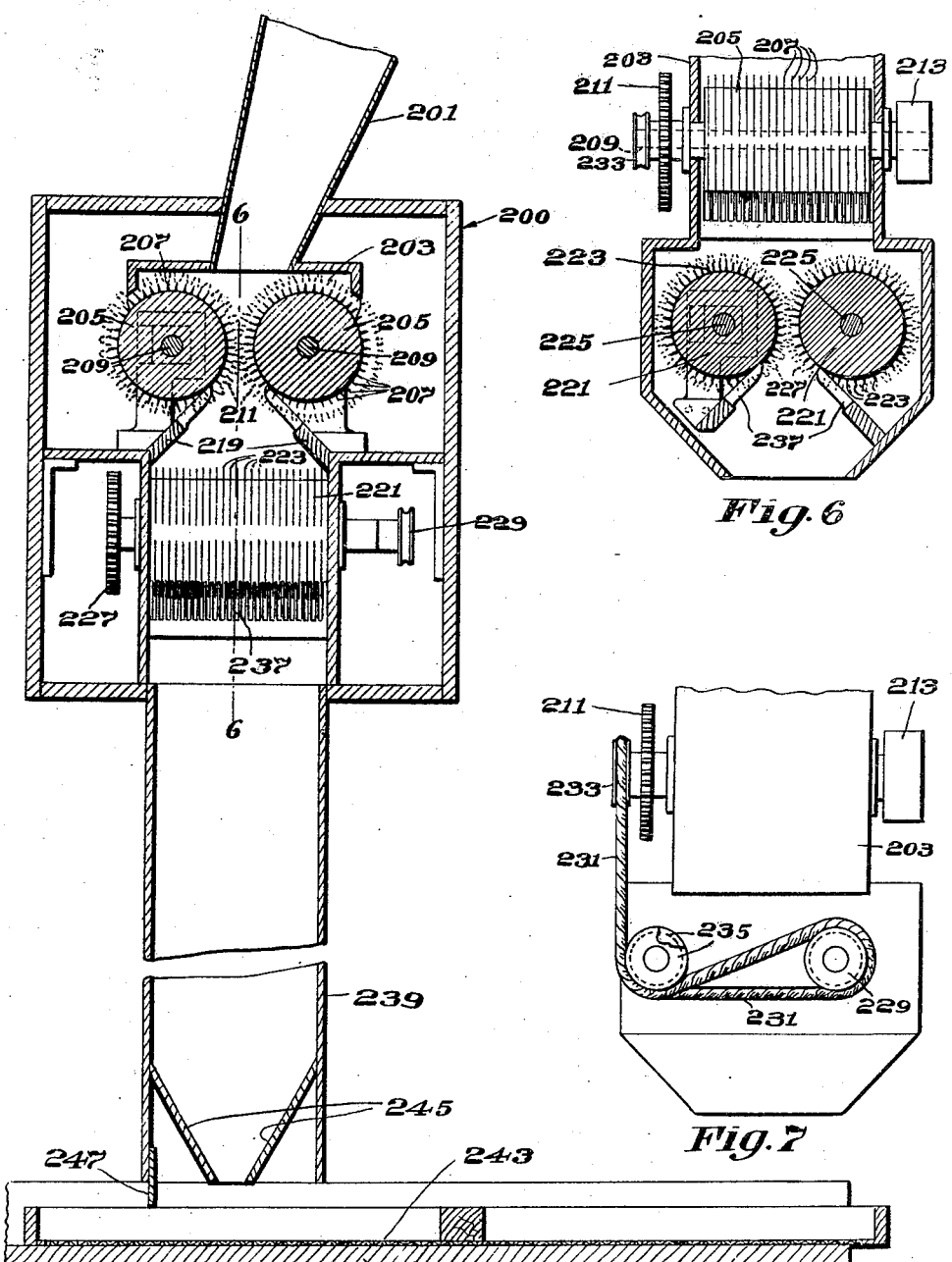

Sept. 23, 1924.                     1,509,204
H. H. HARRISON
APPARATUS FOR TREATING CRANBERRIES
Filed Dec. 1, 1922          5 Sheets-Sheet 5

INVENTOR:
Virginia B. Harrison,
executrix of the estate of
Henry H. Harrison, deceased.
BY
Henry T. Williams
ATTORNEY Patented Sept. 23, 1924.

1,509,204

UNITED STATES PATENT OFFICE.

HENRY H. HARRISON, DECEASED, LATE OF BOSTON, MASSACHUSETTS; BY VIRGINIA B. HARRISON, EXECUTRIX, OF BOSTON, MASSACHUSETTS.

APPARATUS FOR TREATING CRANBERRIES.

Application filed December 1, 1922. Serial No. 604,236.

*To all whom it may concern:*

Be it known that HENRY H. HARRISON, late of Boston, in the county of Suffolk and State of Massachusetts, deceased, has invented certain Improvement in Apparatus for Treating Cranberries, of which the following description, in connection with the accompanying drawings, is a specification, like reference characters on the drawings indicating like parts in the several figures.

The invention to be hereinafter described relates to apparatus for treating cranberries or other fruit.

The cranberry in its natural condition cannot be readily dried or evaporated owing to the hard shell or skin of the berry which resists escape of the water contained within the shell. Letters Patent of the United States No. 1,062,969, dated May 27, 1913, and No. 1,069,946, dated August 12, 1913, granted to the present inventor, respectively disclose a method and machine by which cranberries are so treated that they may be readily evaporated and preserved. Then when they are to be used, water is added thereto, causing the berries to swell, and they are found to retain their original flavor and quality.

The apparatus disclosed herein is an improvement upon that disclosed in said Letters Patent No. 1,069,946.

By the present apparatus, the cranberries are washed in water, drained, and the cleaned cranberries are then subjected to light pressure to facilitate separation of the sound berries from the softer, decayed or frostbitten berries. The bad berries are flattened by this pressure, whereas, the sound berries are sufficiently strong and firm to resist this pressure, and are not flattened, but retain their rounded character. The good and bad berries are then sorted by feeding the flat, bad berries in one direction, and the round, sound berries in another direction. The skins of the sound berries are then perforated at a multiplicity of points distributed throughout the surfaces thereof, and are then subjected to heat which evaporates the water therefrom.

The berries shrivel, but do not lose their integrity. They may be stored in this condition until it is desired to use the same. Then they are placed in water which readily enters the interiors of the berries through the perforations in their skins, causing the berries to swell and regain their original quality and flavor.

It is a well known fact that if decayed berries are permitted to stand with sound berries for any substantial length of time, the presence of the bad berries will taint the berries as a whole, and impair their flavor, but by the present apparatus the bad berries are eliminated, and hence cannot contaminate the sound berries.

The character of the invention may be best understood by reference to the following description of one good form of apparatus shown in the accompanying drawings, wherein:

Fig. 1 is a perspective view of the portion of the apparatus by which the berries may be washed and the water drained therefrom;

Fig. 2 on an enlarged scale is a vertical longitudinal section through a portion of the apparatus shown in Fig. 1;

Fig. 3 is a perspective view of the apparatus which may receive the clean berries, puncture the berries, subject the same to pressure, separate the bad from the good berries, and deliver the good berries to the perforating or venting mill which discharges the berries to the delivery table;

Fig. 4 on an enlarged scale is a vertical longitudinal section through a portion of the apparatus shown in Fig. 3;

Fig. 5 is a vertical section through the perforating mill;

Fig. 6 is a vertical section taken on line 6—6 of Fig. 5;

Fig. 7 is a side elevation of a portion of the mill;

Figure 3:
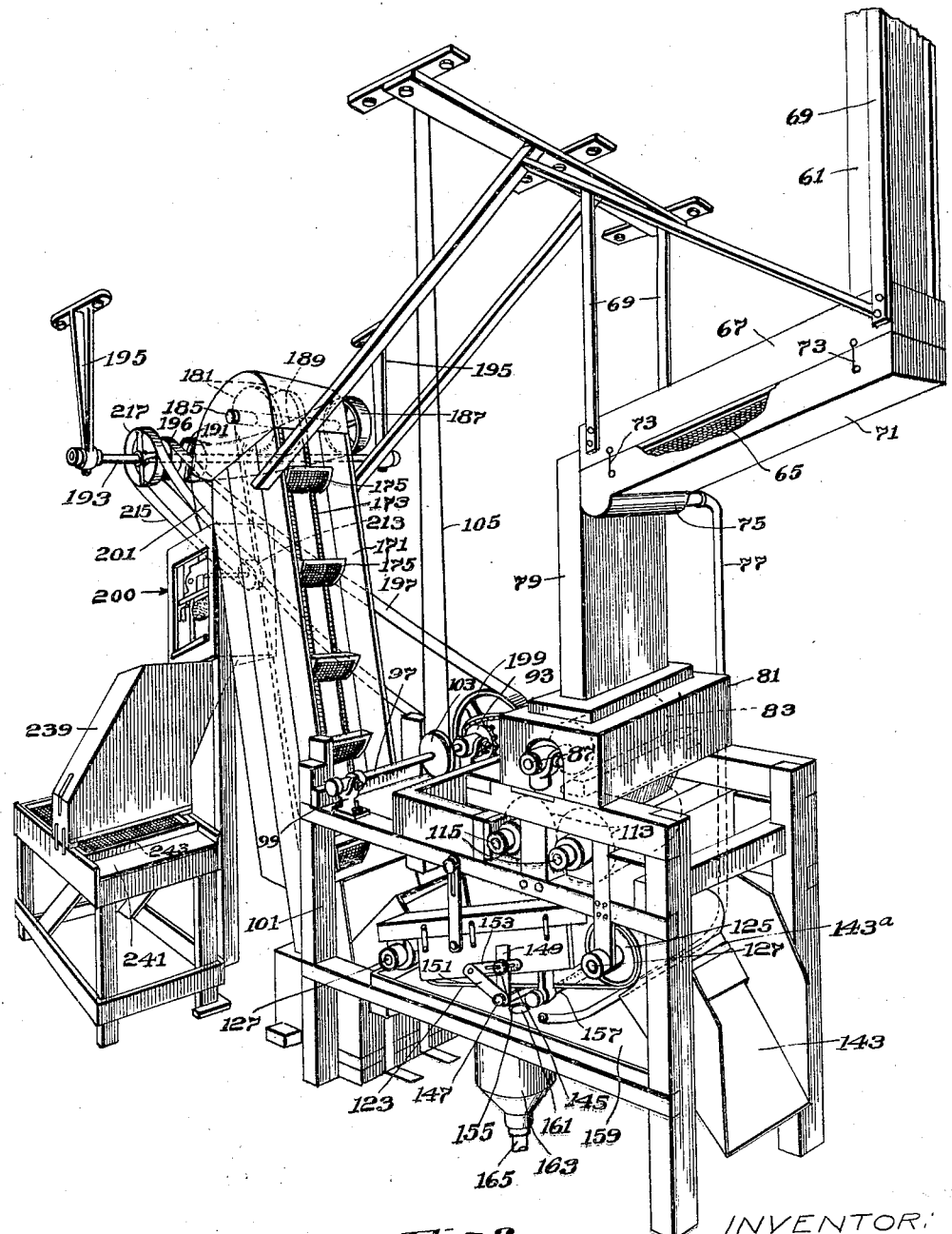

Referring to the drawings, the means for washing the berries comprises a hopper 1 (Figs. 1 and 2) in which a supply of berries may be dumped. This hopper has an inclined bottom 3 along which the berries may gravitate to a mouth 5 provided with a gate 7 connected by a link 9 with a hand lever 11 fulcrumed on a pin 13 at one end of the hopper. The hand lever may be grasped and rocked to open or close the gate 7 and to regulate the opening of the mouth 5 as required.

In front of the hopper and at a level beneath the same is a tank 15 provided with a partition 17 dividing the tank into a chamber 19 and a chamber 21. This partition extends down toward but is spaced from the bottom of the tank. Water or other cleansing liquid may be introduced into the tank through a pipe 23 conveniently located at the lower edge of the partition 17 and having ports in the lower side of the pipe for delivering and distributing the water to the tank. The water may escape from the tank through a discharge port 25 communicating with a pipe (not shown) for carrying the water to the point desired.

To feed and regulate the delivery of berries from the hopper mouth 5 into the tank, a feed wheel 27 may be provided in the chamber 21 and have blades 29. This wheel may be mounted on a shaft 31 which projects beyond one side of the tank, and has a pulley 33 fast thereon connected by a belt 35 with a pulley 37 on a countershaft 39 journalled in bearings in standards 41. The construction is such that the berries emerging from the mouth 5 will enter the chamber 21 and be received in the pockets between the wheel blades 29. The rotation of the wheel will discharge the berries into the chamber 19, and they may be desirably guided into said chamber by a curved wall 43 adjacent to the water pipe 23. As the berries pass between the pipe and the curved wall, they will be sprayed and cleaned by the water delivered from the pipe.

To further contribute to the cleansing of the berries, a wheel 45 may be provided in the chamber 19, and have arms 47 connected by rods 49 arranged sufficiently close to one another to prevent the berries from escaping between them. This wheel may be mounted on a shaft 51 having an end projecting beyond the tank and having a pulley 53 fast thereon connected by a belt 55 with a pulley 57 on the countershaft 39.

The construction is such that when the wheel 45 is rotated in a clockwise direction (Fig. 2), the rods 49 will pass through the water in the tank, agitate the same, and positively feed the berries through the tank. As the berries are forced by the rods through the water, the latter will have a desirable cleansing effect thereon. Any dirt or other foreign material will sink to the bottom of the tank and may be carried out through the port 25, whereas, the berries will tend to float and rise to the surface of the water in the tank. The wheel will also serve to feed the berries through the tank to a suitable draining device which will now be described.

This device, in the present instance of the invention, comprises a box 57 having at the top thereof an inclined screen 59 which projects from the forward side of the tank to a chute 61 to deliver the berries to apparatus to be described.

The berries are delivered by the wheel 45 to the upper edge of the screen 59, and as the berries roll down over said screen toward the chute 61, water may drain from the berries down into the box 57 and escape from the latter through a discharge port 63.

To further drain the water from the berries, a screen 65 (Fig. 3) may form the bottom of an inclined trough 67 having one end disposed beneath the lower end of the chute 61, said trough being supported by suitable hangers 69.

Beneath the trough 67 is a box 71 connected to the trough by links 73. At the lower end of the box 71 is a groove 75 communicating with a discharge pipe 77.

The construction is such that the berries will drop down through the chute 61, and will strike and bounce and roll along the screen 65. This will shake water therefrom, which will pass through the screen into the box 71 and be conveyed from the latter by the pipe 77.

Figure 8:
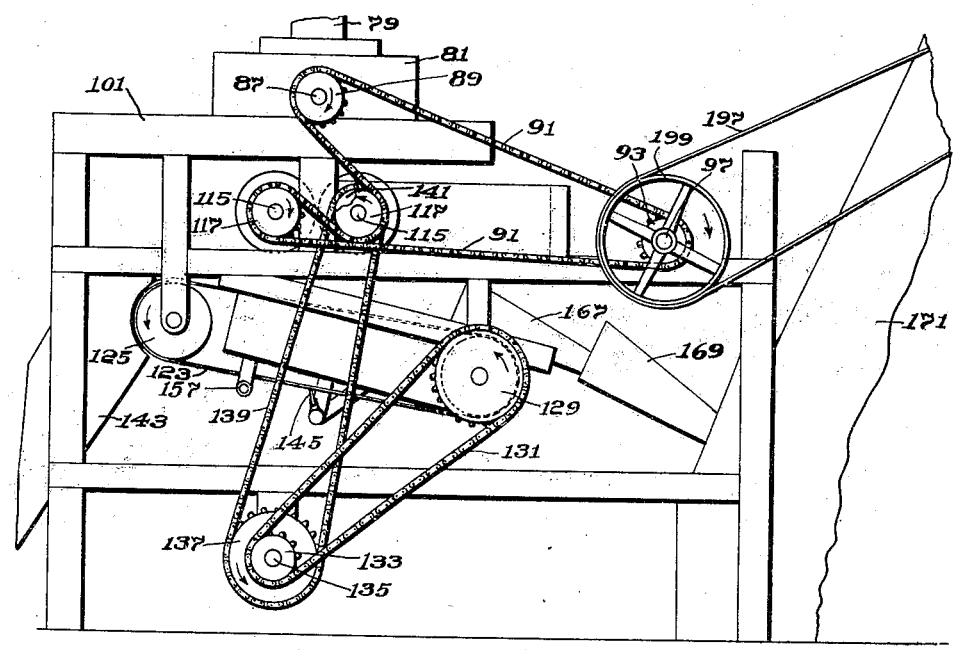
Fig. 8 is a side elevation of a portion of the apparatus, and illustrates driving means therefor.

Suitable means may be provided to puncture the berries preparatory to subjecting them to the pressure device to be described. To accomplish this, in the present instance, a chute 79 (Figs. 3 and 4) receives the berries from the trough 67 and conducts them to the open end of a casing 81, in which is mounted the puncture wheel 83 having a multiplicity of pins 85 projecting from the surface thereof. This wheel is mounted on a shaft 87 which projects beyond the casing and has a sprocket wheel 89 (Fig. 8) fast thereon connected by a sprocket chain 91 with a sprocket wheel 93 on a drive shaft 97 journalled in bearings in brackets 99 mounted on a frame 101 which may also serve to support the casing 81. Also fast on the shaft 97 is a pulley 103 connected by a belt 105 with a pulley 107 (Fig. 1) on the countershaft 39 referred to.

Cooperating with the puncture wheel 83 is a doffer fork 109 (Fig. 4) having teeth adapted to project in between the pins 85 on the wheel 83, said fork being mounted on a bar 111 in the casing 81.

The construction is such that the berries dropping down through the vertical chute 79 will be impaled upon the pins of the wheel 83, and one or more of these pins will project through the skin of each berry to puncture the same.

Suitable means may be provided to subject the berries to a yielding pressure to flatten the bad berries, but not the sound berries, thereby to facilitate sorting the berries to separate the bad from the good ones. This means, in the present instance of the invention, comprises a pair of rolls 113 made of soft rubber or other suitable material which is readily yieldable. These rolls are mounted on shafts 115 journalled in bearings mounted on the frame. These shafts project beyond the rolls and have fast thereon sprocket wheels 117 (Fig. 8) which are driven by the sprocket chain 91 referred to.

Communicating with the casing 81 is a hopper 119 (Fig. 4) having a mouth for delivering the berries to the bight between the pressure rolls 113. Cheeks 121 extend from the hopper 119 downward past the ends of the rolls, and prevent the berries from escaping beyond said ends.

The construction is such that the berries impaled on the puncture wheel 83 will be doffed from the wheel by the comb 109, and will gravitate downward through the hopper 119 to the bight between the rolls 113. Since these rolls are rotated in opposite directions, the berries will be caught between the rolls and subjected to pressure thereby. The soft or bad berries will be flattened by the rolls, but the sound berries will be sufficiently strong and stiff to withstand this pressure, owing to the soft, yielding character of the rubber of which the rolls are made.

After the berries have been subjected to pressure, they gravitate downward from the rolls onto a conveyer 123 (Fig. 4) carried by cylinders 125 mounted on shafts 127 journalled in bearings suitably supported by the frame. One of these shafts 127 has a sprocket wheel 129 (Fig. 8) fast thereon connected by a sprocket chain 131 with a sprocket wheel 133 fast on a drive shaft 135 journalled in bearings suitably supported by the frame. Also fast on the shaft 135 is a sprocket wheel 137 connected by a sprocket chain 139 with a sprocket wheel 141 fast on one of the pressure roll shafts 115.

The conveyer 123 is disposed with an inclination such that the round berries may roll downward along the upper run of the conveyer toward the right (Fig. 4). This run of the conveyer, however, is fed toward the left (Fig. 4). The consequence is that only the round and perfect berries will roll downward along the conveyer in opposition to its direction of travel, whereas, any overripe or unduly soft berries remaining in flattened condition as a result of the action of the pressure rolls thereon, will fail to roll on the conveyer, and will be carried thereby upward toward the left (Fig. 4), where they may be delivered into a discharge chute 143.

To prevent the bad berries from sticking to the conveyer, a wiper 143a of rubber or other suitable material may be mounted on the chute 143, and scrape the surface of the conveyer as it passes over the wiper. To clean the belt, a wiper 145 of rubber or other suitable material may be mounted beneath the lower run of the conveyer. This wiper may be mounted on a rock shaft 147 carried by brackets 149, and the angle of the wiper may be varied by an arm 151 fast on the shaft and connected to a link 153 having an elongated slot receiving a set screw 155. The construction is such that the link may be adjusted and operate through the arm to arrange the wiper at the angle desired, and then the set screw may be tightened to hold the parts in their adjusted positions.

To further clean the surface of the under run of the conveyer, a pipe 157 may be provided beneath the conveyer and have a row of holes in the upper side thereof through which a sheet of water may be forced to the surface of the conveyer to wash the same.

To catch the water beneath the conveyer, a basin 159 may be mounted on the frame, and may incline to a discharge port 161 communicating with a receptacle 163 which may deliver the water to a pipe 165 to conduct the water to the point desired. The drain pipe 77 referred to, may be extended downward so that its lower end may deliver water into the catch basin 159.

Suitable means may be provided for conducting the berries rolling down from the conveyer to the perforating mill. To accomplish this, in the present instance, a chute 167 (Fig. 4) may be provided at the lower end of the conveyer, and may be placed at an inclination so that the berries may roll therethrough into a throat 169 leading to the lower end of a casing 171, in which is mounted a bucket conveyer 173 comprising buckets 175 connected at intervals to sprocket chains 177 on lower sprocket wheels 179 and upper sprocket wheels 181 (Fig. 3), said sprocket wheels being fast on shafts 183 and 185 respectively, and said shafts being journalled in suitable bearings mounted on the casing 171. The upper shaft 185 has a pulley 187 fast thereon connected by a belt 189 with a pulley 191 fast on a countershaft 193 journalled in bearings in brackets 195. Also fast on said shaft is a pulley 196 connected by a belt 197 with a pulley 199 fast on the shaft 97 referred to.

Each of the buckets 175 of the conveyer may have a perforated wall 175a of screen or other suitable material to allow escape of moisture from the berries and allow a draft of air to pass around and dry the berries as they are carried upwardly by the conveyer.

The berries elevated by the bucket conveyer are delivered to the perforating mill 200 which will now be described. This mill comprises a hopper 201 (Figs. 5 and 6) for delivering the berries into a chamber 203 in which are mounted a pair of rolls 205, each provided with a multiplicity of sharp pins 207 projecting from the periphery thereof. These rolls are mounted on shafts 209 journalled in suitable bearings, said shafts being provided with intermeshing gears 211, and one of the shafts has a pulley 213 fast thereon which may be connected by a belt 215 with a pulley 217 fast on the countershaft 193 referred to.

The berries flowing down through the hopper 201 will be perforated by the pins 207 as they pass between the rolls 205. To doff the berries from these rolls, forks 219 are provided beneath the rolls and have teeth which project diagonally upwardly between the pins 207.

To further perforate the berries, a pair of rolls 221 are provided beneath the rolls 205, and have sharp pins 223 projecting from the peripheries thereof. These rolls are mounted on shafts 225 whose axes project transversely to the axes of the shafts 209. Fast on said shafts are intermeshing gears 227, and one of the shafts has a pulley 229 fast thereon connected by a belt 231 with a pulley 233 fast on one of the shafts 209, said belt being guided by suitable pulleys 235 intermediate the pulleys 229 and 233. The construction is such that the berries passing down from the rolls 205 will pass between the rolls 221 and be further perforated by the pins 223. The two sets of rolls will serve to puncture the berries with a multiplicity of perforations which are distributed substantially throughout the surfaces of the skins of the berries.

To doff the berries from the lower rolls 221, combs 237 may be provided having teeth projecting diagonally upward between the pins 223 of said rolls.

The doffed, perforated berries are conducted from the perforating mill into a chute 239 (Fig. 3) above a table 241 adapted to receive screen trays, such, for example, as the tray 243. These trays are adapted to be slid along the table beneath the chute 239 and be loaded with berries flowing from the chute. To contribute to the proper distribution of the berries on the trays, the chute may have at the bottom thereof a pair of downwardly converged walls 245, and adjacent the outlet between said walls is a scraper plate 247 which will serve to insure the delivery of the berries to the trays in a layer of uniform, predetermined depth.

The trays loaded with the berries may be mounted on a suitable truck for conveying them to the oven in which the water is evaporated from the berries.

The operation of the apparatus will be readily understood. The cranberries are dumped into the hopper 1 and gravitate therefrom through the mouth 5 under the control of the gate 7. The berries are fed with restrained regulation from the hopper into the tank 15 by the rotary wheel 27. The berries are forced through the water in the tank by the wheel 45, and any heavy foreign matters mixed in with the berries may sink to the bottom of the tank and be carried out through the port 25.

The berries are thrown by the rods 49 of the wheel 45 onto the inclined screen 59 and bounce and roll along the same to the chute 61. The water shaken from the berries, passes through the screen 59 into the box 57, and may be carried away therefrom through the port 63.

The berries gravitate down through the chute 61, drop onto the screen 65 and bounce and roll along the same down into the chute 79. On passing from the lower end of the chute 79, the berries strike and are impaled upon the pins of the wheel 83, and in the course of the rotation of the latter are doffed from the wheel by the comb 109.

The berries are fed thence between the soft rubber rolls 113 which serve to flatten the soft or bad berries, but do not destroy the rounded character of the sound berries.

Figure 9:
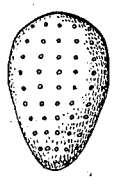
Fig. 9 is a view of one of the punctured or vented berries.
Figure 10:
Fig. 10 is a view of one of the berries after it has been evaporated.

The mass of round and flat berries drop onto the conveyer 123, the flat berries being carried by the conveyer to the chute 143, while the round berries roll in the opposite direction down along the conveyer through the chute 167 and the throat 169 into the casing 171. Here the berries are caught by the buckets 175 and elevated to the mill 200 which serves to puncture or vent the skins of the berries at a multiplicity of points. The berries delivered from the mill pass into the chute 239 and are received by the tray 243 on the table 241. As soon as one tray is filled, it is slid from the table, and another tray is advanced on the table into receiving position beneath the chute. The trays filled with cranberries are then transferred by a suitable truck to the oven for drying or evaporating the cranberries. This shrivels the berries from the form of berry shown in Fig. 9, to the form shown in Fig. 10.

Berries thus treated will keep for a long period, and when it is desired to use the same, water is added thereto, causing the berries to swell and return substantially to their original form.

The term "perforate" as applied to the skins of the berries will be understood as generic to any suitable form of venting for the berries. While the apparatus has been described more particularly in reference to the treatment of cranberries, it will be understood that it may be desirably employed for treating any fruit of somewhat similar characteristics in preparation for evaporation.

It will be understood that the invention is not limited to the specific apparatus described herein, and that various deviations may be made therefrom without departing from the spirit and scope of the appended claims.

What is claimed is:

1. Apparatus for treating cranberries, comprising, in combination, means for cleaning the berries, means or puncturing the berries, means for pressing the berries to crush the soft but not the sound ones, an inclined conveyer for receiving the berries and feeding the soft ones upward while allowing the sound ones to roll down on the conveyer, means to receive the soft berries from the conveyer, a mill for perforating the sound berries, and means for conducting the latter from said conveyer to said mill.

2. Apparatus for treating cranberries, comprising, in combination, a hopper, a tank adapted to contain water, means for feeding the berries from the hopper to the tank, a screen, means for delivering the berries from the tank to said screen, that the water may be drained therefrom, means for automatically separating the unsound from the sound berries, and means for automatically perforating the skins of the berries to liberate the water contained therein.

3. Apparatus for treating cranberries, comprising, in combination, means for subjecting the berries to pressure to crush the unsound but not the sound berries, an inclined conveyer for receiving the berries from the pressure means and adapted to convey the unsound berries upward while allowing the sound berries to roll downward on the conveyer, and a mill having rollers provided with pins for perforating the skins of the berries to liberate the water contained in the berries.

4. Apparatus for treating cranberries, comprising, in combination, a pair of rolls for pressing the berries between them to crush the unsound but not the sound berries, means to receive the berries from said rolls and automatically separate the unsound from the sound berries, and means for perforating the skins of the sound berries to liberate the water contained therein.

5. Apparatus for treating cranberries, comprising, in combination, a roller having pins for puncturing the skins of the berries, a pair of rolls for pressing the punctured berries between them to crush the unsound but not the sound berries, means for automatically separating the unsound from the sound berries, and means for perforating the skins of the sound berries at a multiplicity of points to liberate the water contained therein.

6. Apparatus for treating cranberries, comprising, in combination, a cylinder having sharp pins thereon, means to deliver the berries to said pins that the latter may puncture the shells of the berries, means to doff the punctured berries from said cylinder, a pair of rolls for receiving and pressing the puncturing berries between them, thereby to flatten the unsound but not the sound berries, means to separate the unsound from the sound berries, and means for further perforating the skins of the sound berries to enable ready liberation of the water contained in the berries.

7. Apparatus for treating cranberries, comprising, in combination, a hopper for receiving the berries, a tank adapted to receive water, means for controlling the feed of berries from the hopper into the tank, a draining screen, a wheel mounted in said tank and having provision for feeding the berries through the water to said screen, a second draining screen, a chute for delivering the berries from the first screen to the second screen, means to receive the drained berries and puncture the skins thereof, means for yieldingly pressing the berries to crush the unsound but not the sound berries, an inclined conveyer for receiving the berries from the pressure means and adapted to convey the crushed berries upward while allowing the sound berries to roll downward on the conveyer, and means for receiving the sound berries and perforating the skins thereof to liberate the water contained therein.

8. Apparatus for treating cranberries, comprising, in combination, a hopper for receiving the berries, a tank adapted to receive water, means for controlling the feed of berries from the hopper into the tank, a draining screen, a wheel mounted in said tank and having provision for feeding the berries through the water to said screen, a second draining screen, a chute for delivering the berries from the first screen to the second screen, means to receive the drained berries and puncture the skins thereof, means for yieldingly pressing the berries to crush the unsound but not the sound berries, an inclined conveyer for receiving the berries from the pressure means and adapted to convey the crushed berries upward while allowing the sound berries to roll downward on the conveyer, a mill for perforating the skins of the sound berries to liberate water contained therein, and an elevator for carrying the sound berries upward from the conveyor to said mill.

9. Apparatus for treating cranberries, comprising, in combination, a hopper for receiving the berries, a tank adapted to receive water, means for controlling the feed of berries from the hopper into the tank, a draining screen, a wheel mounted in said tank and having provision for feeding the berries through the water to said screen, a second draining screen, a chute for delivering the berries from the first screen to the second screen, means to receive the drained berries and puncture the skins thereof, means for yieldingly pressing the berries to crush the unsound but not the sound berries, an inclined conveyer for receiving the berries from the pressure means and adapted to convey the crushed berries upward while allowing the sound berries to roll downward on the conveyer, means for receiving the sound berries and perforating the skins thereof to liberate the water contained therein, a table for receiving trays, and a chute for conducting the perforated berries from the mill to said trays.

10. Apparatus for treating cranberries, comprising, in combination, a hopper for receiving the berries to be treated, a tank adapted to contain water, a feed wheel for controlling delivery of the berries from the hopper to the tank, a draining screen, means for passing the berries through the water in the tank to said screen, means for automatically separating the unsound from the sound berries, a mill having means for automatically perforating the skins of the sound berries, means to conduct the sound berries from the separating means to said mill, a support adapted to receive trays, and means for conducting the perforated berries from the mill to said trays.

11. Apparatus for treating cranberries, comprising, in combination, a hopper for receiving the berries to be treated, a tank adapted to contain water, a feed wheel for controlling delivery of the berries from the hopper to the tank, a draining screen, means for passing the berries through the water in the tank to said screen, means for automatically separating the unsound from the sound berries, a mill having means for automatically perforating the skins of the sound berries, means to conduct the sound berries from the separating means to said mill, a support adapted to receive trays, and means for delivering the perforated berries from the mill to said trays and having provision for controlling the depth of the layer of berries on the trays.

12. Apparatus for treating cranberries, comprising, in combination, means for subjecting the berries to pressure to deform the unsound but not the sound berries, means for automatically separating the unsound from the sound berries, means for automatically venting the skins of the sound berries to liberate the moisture therefrom, a support for a tray, and means to conduct the berries from the venting means to the tray.

13. Apparatus for receiving cranberries, comprising, in combination, means for receiving a mass of cranberries, means for subjecting the berries to a pressure sufficient to deform the unsound but not the sound berries, means for automatically conducting the berries from the receiving means to the pressure means, means for automatically separating the deformed berries from the sound berries, and means for receiving the sound berries and for automatically venting the skins thereof without destroying the substantial integrity of the berries.

In testimony whereof I have signed my name to this specification.

VIRGINIA B. HARRISON.
*Executrix of Henry H. Harrison, deceased.*